Patented June 29, 1954

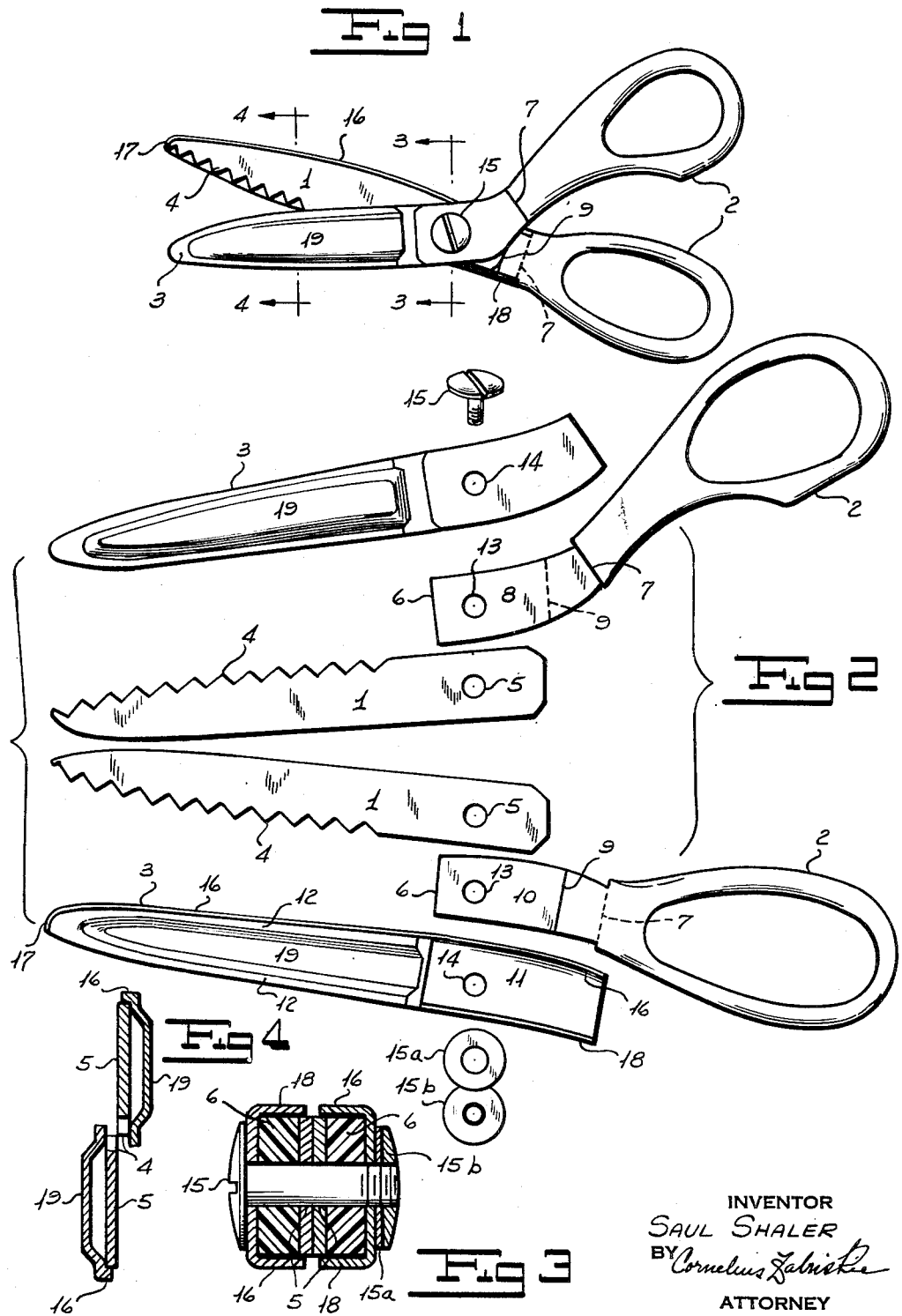

2,682,108

UNITED STATES PATENT OFFICE 2,682,108

SHEARS

Saul Shaler, Jackson Heights, N. Y.

Application January 10, 1952, Serial No. 265,761

1 Claim. (Cl. 30—230)

This invention relates to pinking shears of the type exemplified by Weidauer Patent No. 2,050,870, Carney Patent No. 2,490,414 and Cohn Patent No. 2,508,706, and others of like character. This type of shears comprises cutting blades having cooperating serrated edges and which blades are backed up by fabric guides. The respective guides and blades are provided with appropriate handles and are pivoted to one another on a screw or pivot bolt, after the manner of conventional scissors or shears, to permit of operation of the shears to produce pinked or serrated edges on fabrics and other materials. The blades per se effect the cutting or shearing of the fabric while the fabric guides properly orient and hold the fabric while it is being cut so as to produce the pinking cut.

One object of the present invention is to materially facilitate the manufacture of shears of this kind according to quantity production methods by so constituting the parts as to readily lend themselves to this procedure.

Another object of the invention is to permit the use of different materials in different parts of the shears while minimizing the amount of each material in each part, whereby, e. g., the handle may be conveniently made of plastic, the blades of steel and the fabric guide of aluminum, to produce a very light though highly rigid and satisfactory construction.

Another object of the invention is to eliminate the necessity for small rivets or pins, such as have heretofore generally been considered necessary and to so construct the fabric guides that they serve the purpose of aligning the blades with their respective handles and also definitely fixing the relationship between the blades and the fabric guides.

These and other features of the invention will be apparent from the foregoing detailed description and appended claims when read in conjunction with the accompanying drawing.

The accompanying drawing illustrates one practical embodiment of the invention, but the construction therein shown is to be understood as illustrative, only, and not as defining the limits of the invention.

Figure 1 is a side elevation of pinking shears embodying the present invention.

Figure 2 shows the shears dismantled and the several parts separated from one another so that the individual structures may be clearly seen.

Figure 3 is a section on the line 3—3 of Figure 1.

Figure 4 is a section on the line 4—4 of Figure 1.

In the accompanying drawing, the blades are indicated 1, the handles are designated 2 and the fabric guides bear the reference characters 3. Except for slightly different formation of the teeth in the two blades and the shaping of the handles, as is common in this type of shears, the relatively pivotal assemblies, each comprising a blade, a handle and a fabric guide, are the same, so that same reference characters will be used for both.

The blade 1 is of course perfectly flat with serrations 4 along its cutting edge and it is provided with a perforation 5 near its rear end. Each handle 2 has a tang 6 which at one side is thinned beyond the shoulder 7 to provide a surface 8, while at the other side it is thinned beyond the shoulder 9 to provide a surface 10. Each tang 6 is adapted to be received within a depression 11 formed at the rear end of the corresponding fabric guide and this depression is of such depth that, when the tang is seated therein, the surface 10 will be flush with the lands 12, flat against which the blade 1 is adapted to rest with the rear end of the blade extending over and resting flat against the surface 10 of the handle tang. Each handle tang is provided with a perforation 13 and the fabric guides have perforations 14 and these perforations are alined with the perforations 5 of the blades to receive a pivot bolt 15, with washer 15a and nut 15b which holds the entire assembly together.

Each fabric guide is provided for the full length of its trailing edge with a flange 16 which extends around the front end of the guide as at 17. A shorter flange 18 extends along the leading edge of the guide, but only in the region of the depression 11 for this is the only place its presence is required. The flanges 16, 17 and 18 accurately position the blade 1 against shifting with respect to the fabric guide, while both the guide and blade are locked against pivotal movement relative to the handle, by a close fitting relation between the flanges 16 and 18 and the longitudinal edges of the tang. The fabric guide 3 is stiffened by pressing out longitudinally extending medial bead 19.

When the parts are made as described, the blade may be readily stamped to shape, ground, sharpened and tempered by quantity production methods. Similarly the fabric guide may also be readily stamped from light sheet metal, such as aluminum, while the handle may be molded from an organic plastic. These parts may then be assembled by unskilled labor in a simple, efficient and economical manner to form the finished shears.

It is to be noted that, in the shears of this invention, the fabric guides are actually the keystone of the assembly because it is these elements that lock the blades to the guides and the handles to both of them, and the parts are so shaped as to fall into place with respect to one another in accurate interfitting relation. All the assembler has to do is to insert the handles and blades in the guides, as stated and fasten them together with the bolt. The single pivot bolt serves to hold all the parts together and no rivets, bent lugs or other extraneous fastening devices are required. In the event that the blades become dulled as a result of long usage, they may be readily dismantled by removing the bolt and they may be then readily sharpened or replaced by new blades, as desired.

Considerable material is saved by the present construction as compared with prior pinking shears. Note, for example, that all the parts overlap one another at the pivot bolt sufficiently to provide for passage of the bolt through each of them and to permit the flanges along the leading and trailing edges of the guides to lock the parts of the respective halves of the shears against relative pivotal movement but no one part extends beyond this zone. This is made possible by the use of the flanges, as stated.

The foregoing detailed description sets forth the use in its preferred practical form but the invention is to be understood as fully commensurate with the appended claim.

Having thus fully described the invention, what I claim as new and desire to secure by Letters Patent is:

Pinking shears comprising: a pair of handles provided with tangs, a pair of fabric guides each having at its rear end a depression in which is seated the tang of one of the handles and provided for the remainder of its length with lands, a serrated cutting edge blade seated on the lands of each guide and overlapping and seated on the tang of the corresponding handle, each guide having at its leading edge a flange engaging the contiguous edges of the overlapping parts in the region of the depression and a flange at its trailing edge extending for substantially the full length of said edge and around the forward end thereof, there being perforations in all overlapping parts with a pivot bolt extending through said perforations to secure the parts in assembled relation.

References Cited in the file of this patent
UNITED STATES PATENTS

| Number | Name | Date |
| --- | --- | --- |
| 468,207 | Prohaska | Feb. 2, 1892 |
| 2,050,870 | Weidauer | Aug. 11, 1936 |
| 2,490,414 | Carney | Dec. 6, 1949 |
| 2,511,187 | Weidauer | June 13, 1950 |